United States Patent

[11] 3,586,455

| | | |
|---|---|---|
| [72] | Inventor | Steve Csencsics<br>Erie, Pa. |
| [21] | Appl. No. | 704,116 |
| [22] | Filed | Feb. 8, 1968 |
| [45] | Patented | June 22, 1971 |
| [73] | Assignee | Cerbco, Inc.<br>Erie, Pa. |

[54] TAPPING MACHINE
4 Claims, 2 Drawing Figs.

[52] U.S. Cl. .................................................... 408/9,
10/136, 408/132
[51] Int. Cl. ................................................. B23g 1/00
[50] Field of Search ..................................... 10/129,
136, 136.5, 139, 89; 29/240.5; 64/23

[56] References Cited
UNITED STATES PATENTS

| | | | |
|---|---|---|---|
| RE20,579 | 12/1937 | Bishop et al. ................ | 10/136 |
| 832,221 | 10/1906 | Tuttle ............................ | 10/136 |
| 1,459,981 | 6/1923 | McClellan .................... | 10/136 |
| 1,754,978 | 4/1930 | Buss ............................. | 10/136 |
| 2,284,199 | 5/1942 | Greiner ........................ | 64/23 |
| 2,371,330 | 3/1945 | Irstad ........................... | 64/23 |
| 2,809,533 | 10/1957 | Emrick ......................... | 10/136 |
| 3,146,521 | 9/1964 | Steinmeyer .................. | 29/240.5 |
| 2,253,493 | 8/1941 | Bakewell ...................... | 10/136 |
| 2,257,364 | 9/1941 | Bakewell ...................... | 10/136 |
| 2,881,454 | 4/1959 | Moneymaker ............... | 10/89 |

*Primary Examiner*—Richard J. Herbst
*Assistant Examiner*—E. M. Combs
*Attorney*—Charles L. Lovercheck ABSTRACT: The tapping machine disclosed herein is made up generally of a stand, quill and motor of the familiar type. The machine has an improved clutch-engaging means and an improved means to connect the quill to the clutch. The clutch is made up of two coaxial counterrotating pulleys which are belt driven from the motor. Each pulley has a friction surface on the side face adjacent the other pulley. A friction spool made up of two spaced coaxial discs and fixed to a hollow member, which is journaled in the stand. A fork is connected to the spool to selectively move it into engagement with either of the frictional surfaces. The fork is pivoted to the stand and an air-actuated cylinder has a piston rod engaging an end of the fork to swing it about its pivot.

The machine has a handle to move the quill up and down. A cam is fixed to the quill. The cam actuates a valve to connect air to said air cylinder when the quill is moved toward the work.

The quill is restrained to rotate with the hollow member by a unique means made up of two diametrically opposite slots in the upper end of the hollow member. The quill is telescopically received in the hollow member. The upper end of the quill has an axle extending through it and projecting from each side. A roller on each end of the axle is received in the slots and restrains the quill to rotate with the hollow member. The rollers are antifriction members and thus when the tap engages the work, the rollers freely slide and no frictional force opposes movement of the tap toward the work as is the case with the conventional splined quill.

PATENTED JUN22 1971

3,586,455

INVENTOR.
STEVE CSENCSICS
BY
Charles L. Lovercheck
attorney

TAPPING MACHINE

It is, accordingly, an object of the invention to provide an improved tapping machine.

Another object of the invention is to provide a tapping machine that is simple in construction, economical to manufacture, and simple and efficient to use.

Another object of the invention is to provide a tapping machine having an improved connection between the quill and the driving means.

Another object of the invention is to provide an improved tapping machine having an automatic means for applying rotating force to the quill.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

Figure 2:
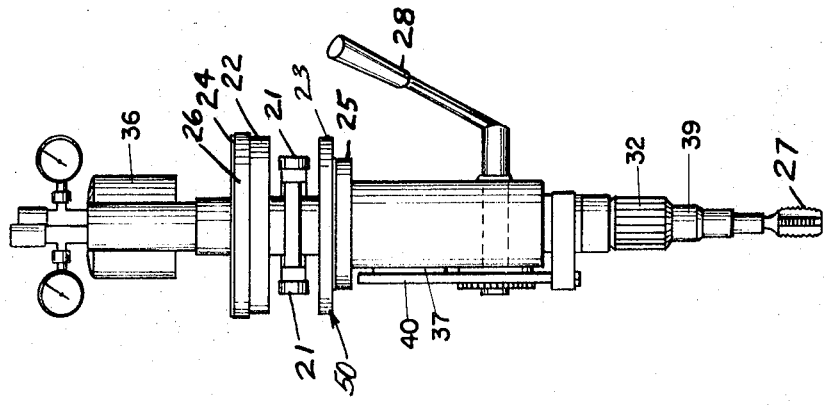
FIG. 2 is a front view of the tapping machine shown in FIG. 1.
Figure 1:
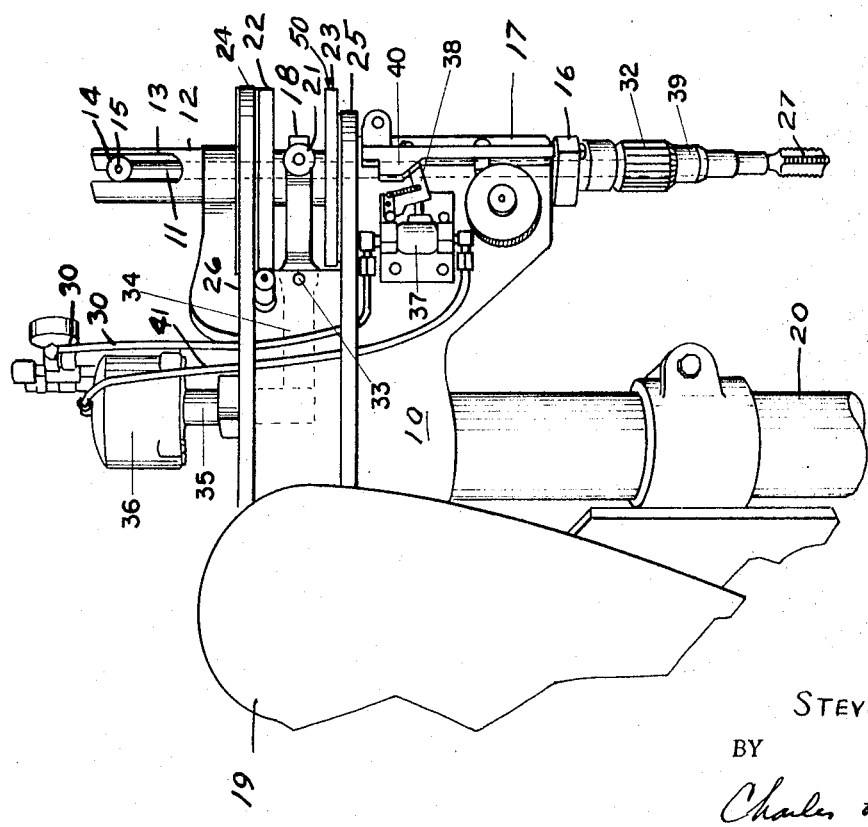
FIG. 1 is a side view of the tapping machine according to the invention.

Now with more particular reference to the drawings, the tapping machine has a stand 10 with a quill 11 supported in a hollow member 12 on the stand. The stand is supported on a vertical member 20 in a conventional manner. The quill is telescopically received in a hollow member 12 which is journaled in the stand 10.

The upper end of the hollow member has two diametrically opposed slots 13 that terminate in the upper end thereof and those slots receive the rollers 14. The rollers 14 are supported on an axle 15 that is transversely disposed and extends through and projects from each side of the quill 11.

The lower end of the quill 11 has a bracket 16 attached to it in a conventional manner with an upwardly extending stem 17 that terminates at its upper end in a cam 40. The cam 40 moves up and down with the quill and with the stem 17 and engages the actuating arm 38 on the valve 37. The valve 37 is supported on the stand and is connected to the cylinder 36 which has a piston rod which engages the arm 34 of the fork 18. The fork has the bifurcated end with rollers 21 which are disposed between and engage the two discs 22 and 23 on the spool. The spool is fixed to the hollow member 12 and rotates with it.

The pulleys 24 and 25 are loosely rotatable on the outside of the hollow member 12 and when the spool 50 made up of discs 22 and 23 is moved up by the fork 18 to frictionally engage the pulley 24 when they move down, they frictionally engage the pulley 25. The pulleys 24 and 25 are driven by the belt 26. The belt 26 passes around a pulley on the motor inside of housing 19 so that the continuous belt drives the two pulleys in opposite directions. The chuck 32 is fixed to the lower end of the quill and it has a lower end 39 with a conventional chuck that receives the tap 27. A handle 28 is supported on the machine which is made to move the quill up and down in a conventional manner. The air cylinder 36 is provided with a piston rod 35 which engages the lever 34.

In practice the operator will start the motor 19 and move the handle 28 downward until the tap engages the work. At this point, the cam 40 will engage the actuating arm 38 on the valve 37 and cause air to flow from the regulated supply 30 through the lower end 31 of valve 37 to the line 41. This will actuate the piston in cylinder 36 and cause the piston rod 35 to force the lever downward. This will bring the fork with rollers 21 thereon upward to cause the disc 22 to engage the pulley 24 and cause the tap to rotate in a forward direction. When the tap reaches the end of its downward stroke, the operator will move the handle 28 upward, and the spool will engage the lower disc 23 and it will drive the tap back out of its hole.

Antifriction rollers 14 roll freely inside the slot 13 and make it easy to move the quill up and down in the hollow member and, since there is little friction between these rollers and slot as compared with the usual spline in a machine of this type of quill.

The foregoing specification sets forth the invention in its preferred practical forms but the structure shown is capable of modification within a range of equivalents without departing from the invention which is to be understood is broadly novel as is commensurate with the appended claims.

The embodiments of the invention in which I claim an exclusive property or privilege are defined as follows:

1. A tapping machine comprising
   a stand,
   a quill,
   tube means supporting said quill on said stand,
   a first clutch member connected to said tube means,
   a second clutch member adapted to be connected to said first clutch member to rotate said quill in a second direction,
   a motor supported on said stand,
   belt means on said motor,
   a third clutch member driven by said belt means,
   clutch means on said machine adapted to selectively connect said third clutch member to said first clutch member,
   actuating means for said third clutch member,
   a cylinder on said stand,
   a piston in said cylinder,
   a piston rod attached to said cylinder and extending therefrom and engaging said actuating means,
   means to move said quill toward and away from work to be threaded,
   cam means connected to said quill and valve means on said stand adapted to be engaged by said cam means whereby said valve means connects fluid under pressure to said cylinder to urge said piston rod into engagement with said actuating means when said handle moves said quill toward said work to a position where said cam engages said actuating means whereby rotation of said quill is started.

2. The machine recited in claim 1 wherein said third clutch member comprises
   a hollow cylindrical member,
   said hollow member rotatably receiving said quill,
   said hollow member having a slot therein,
   a laterally extending axle on said quill,
   a roller member on said axle, said roller being received in said slot whereby said quill is free to slide in said slot and restrained to rotate with said hollow member.

3. The machine recited in claim 1 where said first clutch member and said second clutch member comprise discs disposed concentric to said quill,
   said third clutch member comprising a first pulley and a second pulley each driven by said belt in a direction opposite from the other,
   said means to actuate said clutch comprises a fork having means engaging between said pulleys to selectively force said pulleys toward said first clutch member and to force said pulleys toward said second clutch member.

4. The machine recited in claim 3 wherein said fork is swingably supported on said stand at a pivot point, and
   said piston rod engages said fork at a position on the side of said pivot point remote from said quill.